(12) United States Patent
Reasoner

(10) Patent No.: US 9,534,720 B2
(45) Date of Patent: Jan. 3, 2017

(54) QUICK CONNECT ASSEMBLY INCLUDING FOR USE IN PRESSURIZED FLUID APPLICATIONS AND INCORPORATING AUTO SHUT-OFF FEATURE

(71) Applicant: Michael V. Reasoner, Davison, MI (US)

(72) Inventor: Michael V. Reasoner, Davison, MI (US)

( * ) Notice: Subject to any disclaimer, the term of this patent is extended or adjusted under 35 U.S.C. 154(b) by 157 days.

(21) Appl. No.: 14/324,479

(22) Filed: Jul. 7, 2014

(65) Prior Publication Data

US 2016/0003394 A1 Jan. 7, 2016

(51) Int. Cl.
*F16L 37/091* (2006.01)
*F16L 37/098* (2006.01)
*F16L 37/32* (2006.01)
*F16L 37/36* (2006.01)
*F16L 37/40* (2006.01)

(52) U.S. Cl.
CPC .......... *F16L 37/091* (2013.01); *F16L 37/0982* (2013.01); *F16L 37/0985* (2013.01); *F16L 37/32* (2013.01); *F16L 37/40* (2013.01)

(58) Field of Classification Search
CPC ........ F16L 37/091; F16L 37/413; F16L 37/12; F16L 37/23; F16L 37/133; F16L 37/088; F16L 37/086; F16L 37/098; F16L 37/0915
USPC ...................................................... 251/149.6
See application file for complete search history.

(56) References Cited

U.S. PATENT DOCUMENTS

| | | | |
|---|---|---|---|
| 1,856,917 A | 5/1932 | Jordan et al. | |
| 2,448,817 A | 9/1948 | McArthur | |
| 2,727,759 A * | 12/1955 | Elliott | F16L 29/02 137/614.04 |
| 2,859,060 A | 11/1958 | Davies et al. | |
| 3,234,965 A * | 2/1966 | Anderson | F16L 37/133 137/614.04 |
| 3,413,692 A | 12/1968 | Pressley | |
| 3,420,497 A * | 1/1969 | Wilcox | F16L 37/23 251/149.6 |
| 3,454,047 A * | 7/1969 | Johnston | F16L 37/121 137/614.04 |
| 3,918,679 A | 11/1975 | Silvana | |
| 4,451,069 A * | 5/1984 | Melone | F16L 37/0842 285/315 |
| 4,501,404 A | 2/1985 | Nelson | |
| 4,595,310 A | 6/1986 | Ausprung | |
| 4,614,457 A | 9/1986 | Sammon | |
| 4,733,625 A | 3/1988 | Allen | |
| 5,035,528 A | 7/1991 | Thau | |

(Continued)

*Primary Examiner* — Marina Tietjen
(74) *Attorney, Agent, or Firm* — Dinsmore & Shohl LLP

(57) ABSTRACT

A quick connect assembly having a female fitting attached to an end of a first fluid coupling and exhibiting an interior passage defined by a plurality of linearly extending and circumferentially spaced fingers. Undersides of said fingers collectively define a concentric concave profile an inwardly recessed distance from a connecting end. A male fitting attaches to an end of a second fluid coupling and includes an annular projection at an intermediate location generally matching the concave profile. Upon inserting the male fitting, the female fingers outwardly deflect, following which they inwardly retract concurrent with the projection seating within the interior concave profile. A covering cap is supported upon the male fitting and, upon displacing over projecting ends of the fingers, prevents inadvertent disengagement of the fittings.

16 Claims, 12 Drawing Sheets

(56) References Cited

U.S. PATENT DOCUMENTS

| | | | | |
|---|---|---|---|---|
| 5,255,714 | A | * | 10/1993 | Mullins ................... F16L 37/23 |
| | | | | 137/614.04 |
| 5,372,446 | A | | 12/1994 | Chamberlin |
| 5,564,471 | A | * | 10/1996 | Wilder ................ F16L 55/1015 |
| | | | | 137/614.04 |
| 5,746,548 | A | | 5/1998 | Crandall |
| 5,833,383 | A | | 11/1998 | Bauman |
| 6,003,414 | A | | 12/1999 | Hsieh |
| 6,206,604 | B1 | | 3/2001 | Dembowsky et al. |
| 6,802,275 | B2 | | 10/2004 | Schmidt |
| 7,124,864 | B2 | | 10/2006 | Jones et al. |
| 7,384,209 | B2 | | 6/2008 | Muders et al. |
| 7,637,686 | B2 | | 12/2009 | Wood et al. |
| 8,109,290 | B2 | * | 2/2012 | Sato ........................ F16L 37/34 |
| | | | | 137/614.04 |
| 2007/0257485 | A1 | | 11/2007 | Arosio |
| 2009/0285625 | A1 | * | 11/2009 | Reasoner ................ F16G 11/10 |
| | | | | 403/14 |

\* cited by examiner

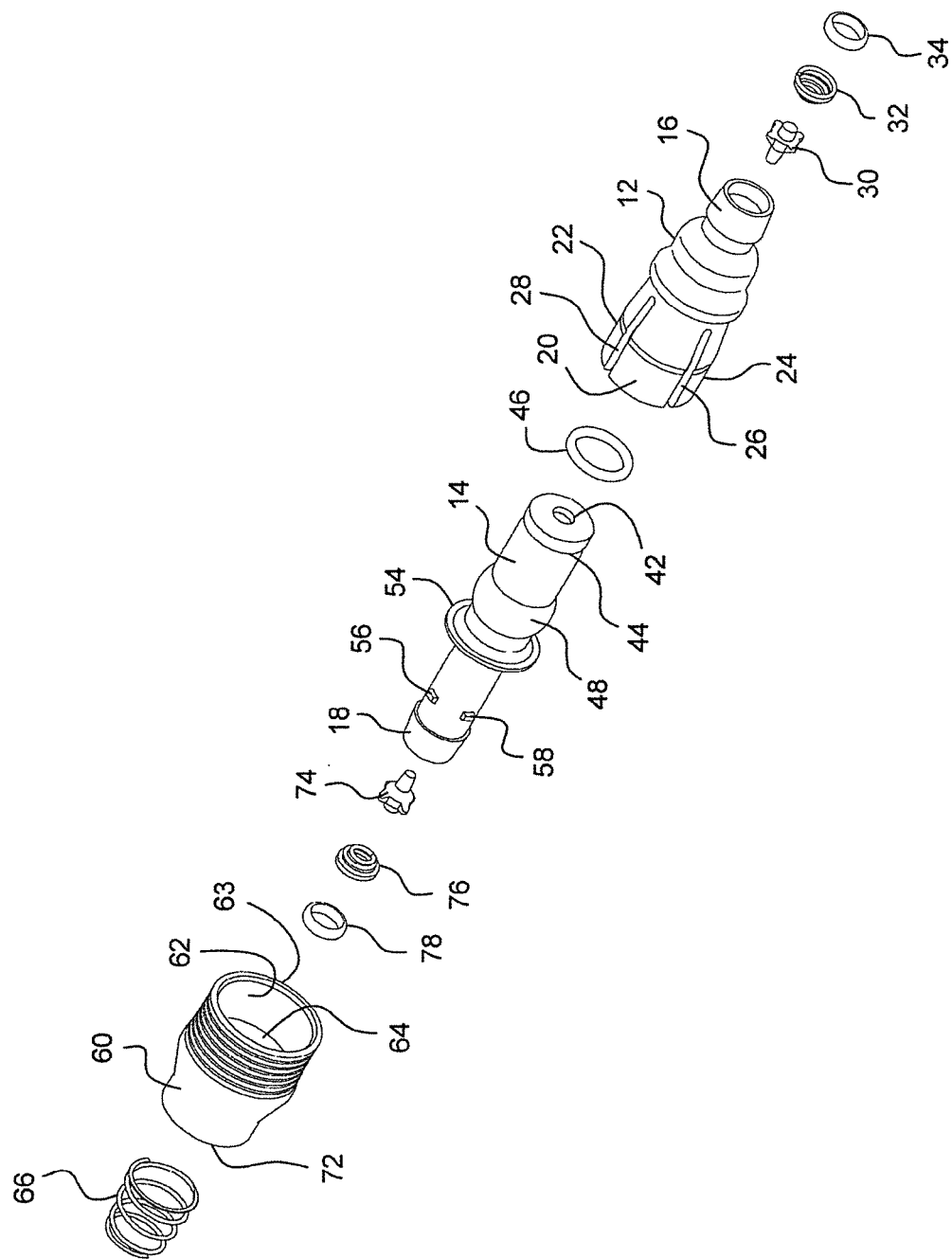

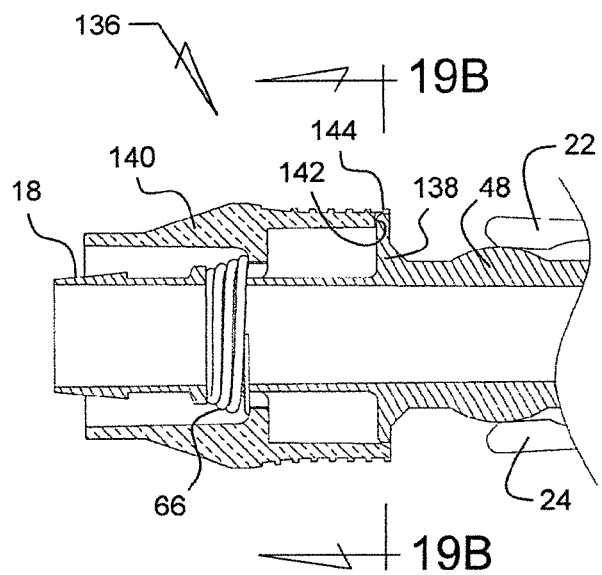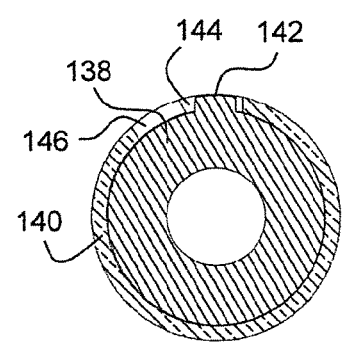
FIGURE 19A          FIGURE 19B
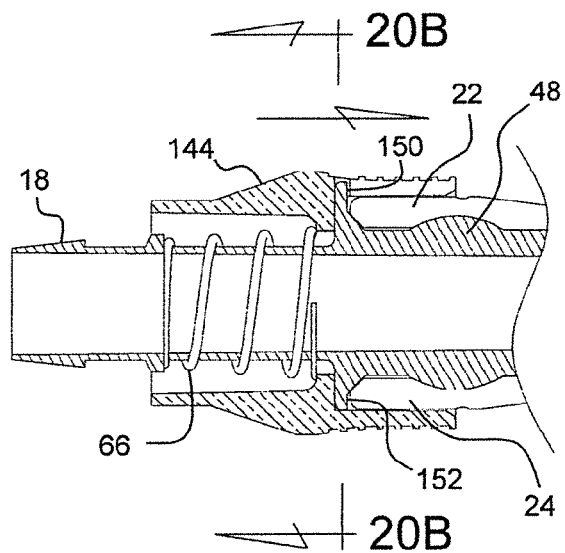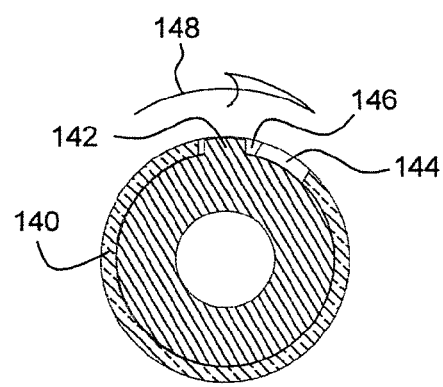
FIGURE 20A          FIGURE 20B

QUICK CONNECT ASSEMBLY INCLUDING FOR USE IN PRESSURIZED FLUID APPLICATIONS AND INCORPORATING AUTO SHUT-OFF FEATURE

FIELD OF THE INVENTION

The present invention discloses a quick connect assembly which functions, without the requirement of clips and fasteners, for retaining together male and female components. More particularly, the present invention discloses such a quick connect assembly which is not limited to but can be particularly configured for use in pressurized fluid (defined in non-limiting fashion to include any of liquids, gases, refrigerants, etc.) applications. An auto shut-off feature is incorporated into the assembly and, upon disconnecting the male and female end fittings, results in spring loaded displacement to interrupt flow through the assembly.

BACKGROUND OF THE INVENTION

Quick connect couplings are well known in the art, such as include first and second engageable members (these also including such as other known male and female or ball and socket members). Quick connect assemblies function to quickly and efficiently engage together the opposing end members and their associated structures, such further typically including male and female extending cables, electrical wires or the like.

A known problem associated with such quick connectors is the requirement for utilizing additional clips or fasteners for retaining together the male/female portions, this adding to both the cost and complexity of the connector assembly. Examples of known quick release assemblies include such as the quick-release socket adapter set forth in Hsieh, U.S. Pat. No. 6,003,414, the ball-and-socket joint connection of Muders, U.S. Pat. No. 7,384,209 and the plug-in coupling of Dembowsky, U.S. Pat. No. 6,206,604.

U.S. Pat. No. 7,927,036, to Reasoner, further describes a quick connect assembly having a female terminal exhibiting an interior passage communicating with a connecting end. The passage is defined by inwardly facing surfaces associated with a plurality of linearly extending and peripherally arrayed beams, the passage exhibiting an enlarged profile an inwardly recessed distance from the connecting end. A male terminal includes a projecting portion generally matching the enlarged profile. The male terminal is inserted into the female terminal, causing the beams to outwardly deflect, following which the beams inwardly retract concurrent with the projecting portion seating within the inner profile. A linearly displaceable and sleeve shaped covering cap is spring supported upon the male terminal and displaceable between a first anti-biased position permitting outward deflection of the beams and a second biased position seating over projecting ends of the beams to prevent inadvertent disengagement of the terminals.

SUMMARY OF THE INVENTION

The present invention discloses a quick connect assembly which functions, without the requirement of clips and fasteners, for retaining together male and female components. More particularly, the present invention discloses such a quick connect assembly which can be particularly configured for use in pressurized fluid applications. As will be described in further detail, the definition of fluid can include any of a liquid, gas, combination thereof (including such as a refrigerant) or other flowable medium.

A female fitting is provided, such as in one application secured to an end of a first fluid carrying conduit. The female fitting exhibits a generally elongated and three dimensional configuration and incorporating a plurality of linearly extending and peripherally arrayed fingers, these in turn defined by a plurality of circumferentially spaced and linear extending slots which extend from an open end along linear edge boundaries defined between the fingers, and for spring loading the fingers radially inwardly.

The fingers each include an inwardly facing surface collectively defining an interior passage communicating with the open connecting end. The passage is further exhibited by a radially enlarged concave profile encircling an inner circumference of the spring loaded fingers, such further generally approximating upper and lower arcuate portions associated with a generally spherical shape, the radially enlarged and circumferentially extending profile being located a selected inwardly recessed distance from the connecting end of the female fitting.

A male fitting also incorporates an elongated and three dimensional shape which is secured to such as an end of a second fluid carrying conduit. An annular projecting portion is provided at an intermediate location of the male fitting and, in one instance, exhibits a generally convex encircling and protuberant shape which generally matches the concave encircling profile defined along the inside surfaces of the circumferentially spaced apart and linear extending fingers, such as which provides benefits to establishing a lash free joint.

The annular projecting location of the male fitting is inserted through the open end of the female fitting, causing the fingers to initially and outwardly deflect, as initial underside locations of the fingers contact the convex protuberant profile of the annular projection of the male component, following which the fingers inwardly retract concurrent with the annular/convex projecting portion seating within the mating concave inner surface profile defined on the inner surfaces of the fingers.

A sleeve shaped covering cap is supported upon the male component in linearly displaceable and spring biased fashion towards the convex projecting portion. In a first operative embodiment, the sliding installation of the fingers of the female fitting over the convex protuberance (with their resultant outer radial expansion) results in contact with the open end face of the cap and subsequent rearward and counter biased displacement of the covering cap to a rearward displaced position, this providing the necessary clearance for the outward deflecting motion of the fingers.

Upon seating of the male (convex) outer annular projection into the female (concave) inner annular recessed profile, again resulting in concurrent inward and spring loaded contraction of the fingers, the inward and spring loaded retraction of the fingers clears an inner diameter of the open end of the cap, thus allowing its spring bias to displace the cap forwardly into a seating position over the projecting ends of the fingers. The open end of the cap also partially overlaps the annular and convex protuberant portion of the male component in order to securely grip the female component fingers in their engaged fashion about the male component protuberance, thereby preventing inadvertent disengagement of the components under tension, compression or bending leads.

In a further operative embodiment, the fittings and cap can be redesigned such that the ends of the fingers will not contact the open end face of the cap, which must instead be initially and manually retracted in its counter biased direction prior to sliding the female fitting into engagement with the male fitting and in inwardly spring loaded fashion over its annular protuberance. At this point, the cap is released and snaps into engagement over the annular concentric interface defined between the fingers and male annular protuberance.

Other embodiments can include the quick connect assembly shipped such that a manually retractable variant of male fitting includes the cover cap retracted in a counter bias displaceable covering cap during shipping, the cap being released in any of a number of different configurations for forwardly displacing over the female fingers, once separately engaged over the male protuberance. A variant of this embodiment can further include a modified spring loaded cap incorporating inner and outer concentrically arranged and inter-displaceable open ended sleeve portions, the inner portion biased forwardly to pre-loading the fingers in the open position relative to the male fitting, with the outer portions inter-displacing over the engaged fingers and upon prior retraction of the inner open ended sleeve portion.

In a further variant of quick connect assembly incorporating a spring loaded cap with dual concentric sleeve portions, the cap can exhibit a pair of redesigned springs to modify the biases established between the inner and outer concentrically arranged and inter-displaceable portions, a first of the spring biases being established between the inner and outer concentric portions and with the outer portion independently sliding into embracing contact around the fingers, upon installation of the female to male fitting interface, and which can further include the cap being forced rearward in a counter-biased fashion by the fingers during installation. In a disengagement protocol, the outer concentric portion of the cap is retracted away from the fingers, with the inner concentric portion further configured with an inwardly angled and annular leading edge and which, upon displacing forwardly, engaging inside locations of the fingers which are forced radially outwardly to facilitate unseating from the male fitting.

An auto shut-off feature is incorporated into the assembly and, upon disconnecting the male and female ends, removes a counter biased holding force applied to an associated shut off button or like shaped component, this resulting in spring loaded displacement of the button in a direction which seals its outer annular profile against an opposing inner facing annular (typically inclined) surface profile associated with either the male and/or female fittings in order to interrupt flow through the assembly. Other features include incorporating any angle or bend into the male or female fittings in order to accommodate different applications or environments.

Additional variants of the inventions include the incorporation of dynamic flex joints into the quick connect assembly, such as integrating into the male fitting an engineered thermoplastic vulcanizate (ETPV) for permitting a degree of force absorbing and attenuating pivot/bend and/or rotation. The flexible membrane can be combined with an inner membrane for forming a non-leaking seal which can be chemically bonded to the inside annular fluid passageways associated with either of the male and female fittings.

BRIEF DESCRIPTION OF THE DRAWINGS

Reference will now be made to the attached drawings, when read in combination with the following detailed description, wherein like reference numerals refer to like parts throughout the several views, and in which:

FIG. 3 is a fully exploded view of the quick connect assembly depicted in FIGS. 1-2 and additionally illustrating the configuration of the male fitting with annular protuberance, the female fitting integrated auto shut-off component, and the arrangement of seals and springs;

FIG. 19A is a partial side cutaway of a male fitting with a pre-retracted covering cap, similar to as previously depicted in FIG. 14, and according to a further related variant;

FIG. 19B is a cutaway view taken along line 19B-19B of FIG. 19A and illustrating a variation of a twist and release relationship established between the open annular end face of the biased and linearly displaceable cap and a modified version of the annular support ledge integrally configured with the male fitting, the cap being illustrated in a first engaged and restrained position;

FIG. 20A is a succeeding illustration to FIG. 19A and illustrating the covering cap in a second rotated and released position in which it displaces linearly over the annular support ledge;

FIG. 20B is a cutaway view taken along line 20B-20B of FIG. 20A and illustrating the cap in a forward displaced and rotated/locked position over the female engaging fingers;

DETAILED DESCRIPTION OF THE PREFERRED EMBODIMENTS

As previously described, the present invention discloses a quick connect assembly which functions, without the requirement of clips and fasteners, for retaining together male and female components. Without limitation, the present invention discloses a quick connect assembly which can be particularly configured for use in pressurized fluid applications, these again being define in non-limiting fashion to include any liquid, gas, combination (e.g. refrigerant) or other flowable medium provided at any internal pressure for passage from a first inlet location associated with a first selected fitting, across a communicating interface established between the fittings, and out through a second outlet location associated with the other fitting. An auto shut-off feature is incorporated into the assembly and, upon disconnecting the male and female ends, results in spring loaded displacement to interrupt flow through the assembly.

Figure 1:
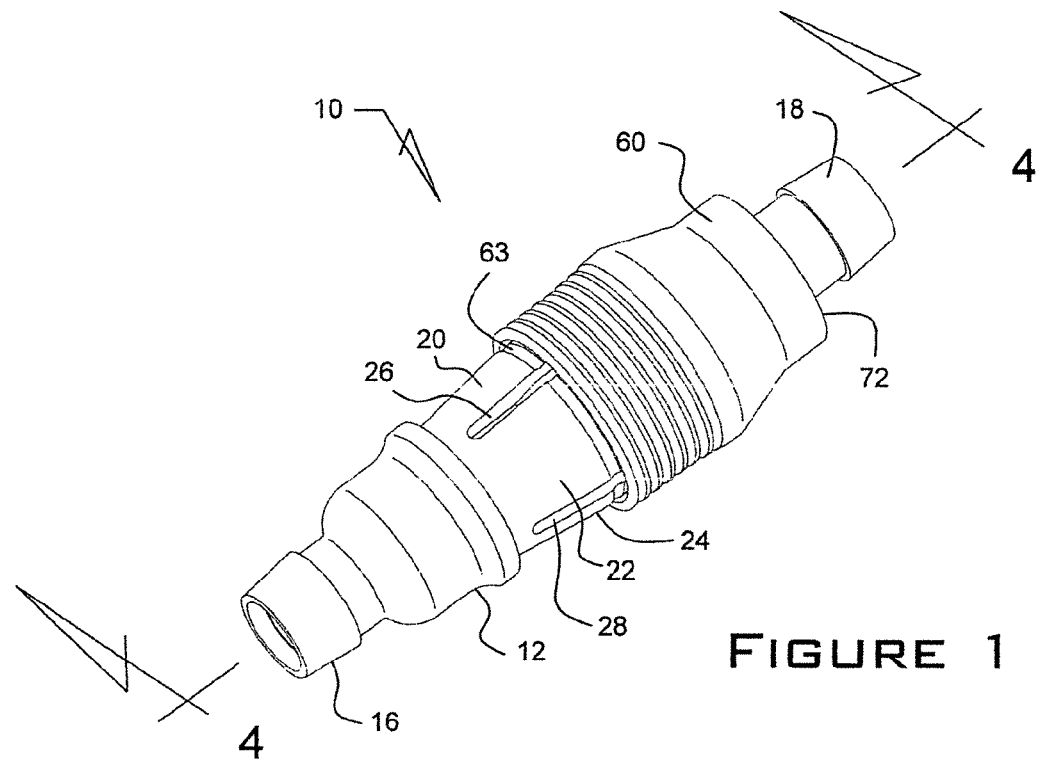
FIG. 1 is a perspective illustration of the quick connect assembly according to one embodiment of the present invention.
Figure 2:
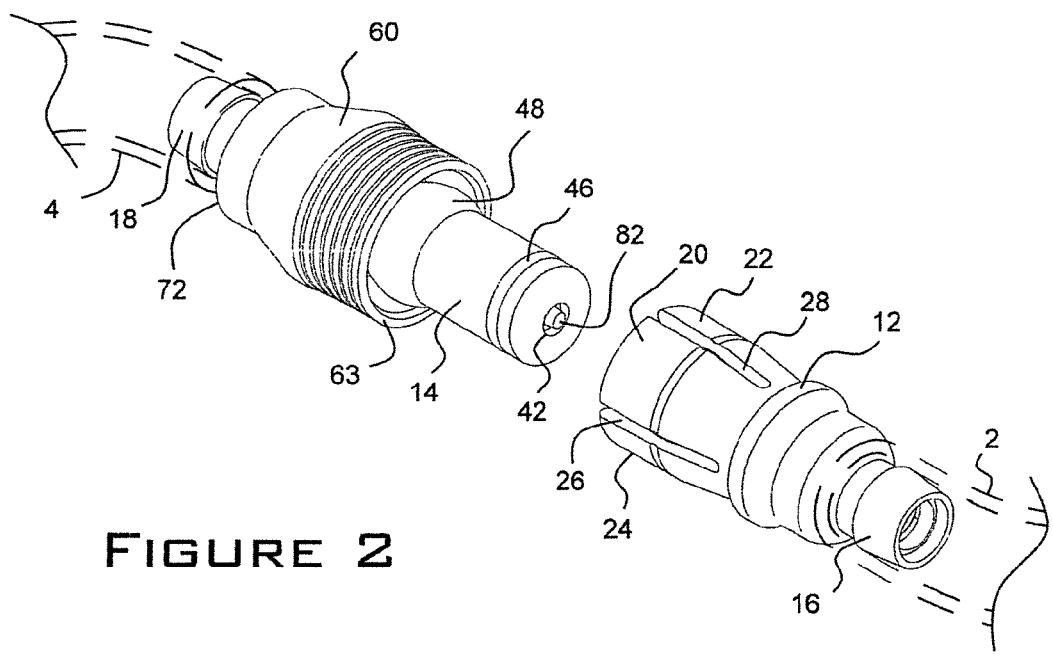
FIG. 2 is a partially exploded view of the assembly in FIG. 1 with male and female fittings separated and better illustrating such features as the female fitting locking fingers, the male fitting cover cap in a forward biased position, and a selected auto shut-off component incorporated into an engaging end of the male fitting.

FIGS. 1-5 illustrate a first variant of quick connect assembly (generally at 10 in FIG. 1) and which includes a female fitting 12 and a male fitting 14. As shown in FIG. 2, the female fitting 12 includes a fluid communicating location including but not limited to a nipple defining end 16 which is adapted to being engaged by a connected end of a first fluid carrying conduit (in phantom at 2), with the male fitting 14 including an opposite nipple defining end having an annular barb profile, see at 18, adapted to being engaged by a connected end of a second fluid carrying conduit (in phantom at 4). The barbed fitting 18 can also be redesign as any of spiraled threads, other press fit configurations, or can be glued to the inter-attaching conduit end.

The main body portions defining the male and female fittings can be constructed of any suitable material, such as including metal or a resilient polymer and which, as will be best described with reference to the exploded view of FIG. 3, including a combination of seals, springs and auto shut-off sub-assemblies for providing both fluid flow during engaging of the fittings and interruption of flow upon separation. Without limitation, the quick connect assembly can be constructed to allow for fluid flow in either direction relative to the engaging interface between the male and female fittings.

Referring to the exploded view of FIG. 3, the female fitting 12 includes a plurality of fingers, in one non-limiting variant including four such fingers, of which three are shown at 20, 22 and 24. The fingers are constructed of an inwardly spring biasing material and extend to an end opposite the nipple end 16. The fingers each exhibit an arcuate profile in cross section, each finger extending in a linear direction as well as collectively arranged circumferentially around a perimeter of the fluid communicating female fitting as shown. A plurality of slots, a pair of which are shown at 26 and 28 are defined at circumferentially offset and linear extending locations along the body of the female fitting 12 and define the individual fingers 20, 22 and 24.

Figure 4A:
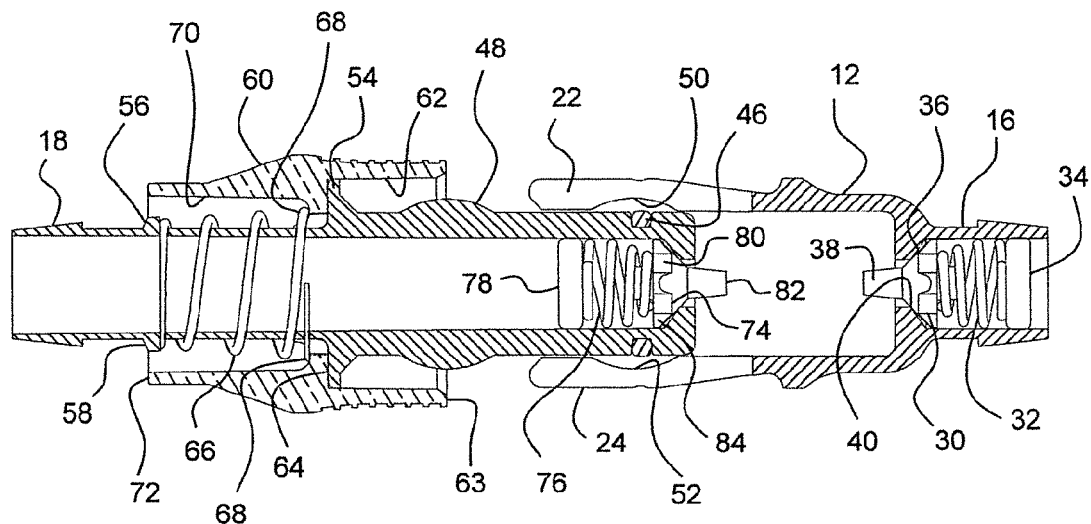
FIG. 4A is a linear cutaway view of the quick connect assembly of FIG. 1 in an initially contacting and pre-engagement position established between the male and female fittings, and in which the inwardly spring biased fingers of the female fitting receive an initial annular surface location of the male fitting prior to engaging the intermediate annular protuberance associated with the male fitting.
Figure 4B:
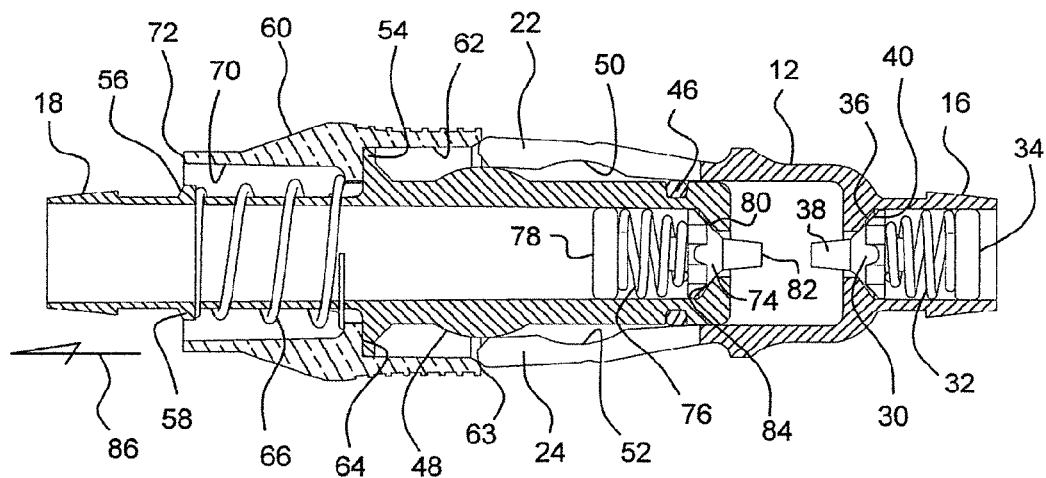
FIG. 4B is a succeeding illustration to FIG. 4A in which biased fingers of the female fitting are shown in an intermediate engaging location relative to the annular protuberance associated with the intermediate location of the male fitting and establishing initial contact with the open end face of the retractable covering cap.

A first shut-off subassembly (hereinafter termed as an "auto" shutoff assembly in acknowledgement that it operates automatically to prevent fluid flow upon disconnecting of the fittings) is incorporated into the female fitting and is depicted in FIG. 3 by an inner linearly displaceable component which is identified as a button 30, this supported in biased fashion within an interior of the nipple connecting end 16 by a coil spring 32 and positioning/supporting press ring 34 (see also FIGS. 4A-4B). As further depicted in the cutaway of FIGS. 4A-4B, the displaceable shut-off button 30 exhibits a generally conical forward face 36, with a further projecting nose portion which terminates in a projecting tip 38 exhibiting a flat end. The button 30 as shown in FIGS. 4A-4B is further seated in a fluid interrupting position (by virtue of the force exerted by spring 32 as further positioned by press ring or stopper 34) against an opposing conical inner face 40 associated with an annular, interior and fluid communicating base surface of the nipple 16.

The male fitting 14 exhibits a generally elongated body and includes a fluid communicating aperture (see enclosed perimeter surface 42) at a fluid communicating end opposite the fluid conduit 4 engaging nipple end 18. An annular recess 44 is defined in an outer circumferential wall location of the male fitting 14 proximate the aperture defined end surface 42 and receives an O-ring 46.

A projecting portion, depicted in the non-limiting and illustrated variants in the form of an annular protuberance 48, encircles an intermediate location of the main body of the male fitting 14 and, as shown, exhibits a generally convex shape in cutaway profile. As will be further described, the sizing and dimension of the protuberance 48 is understood to generally correspond with underside defined concave recesses, see at 50 and 52 in FIGS. 4A-4B associated with corresponding fingers 22 and 24 and which are defined along inside extending surfaces thereof. As is further shown, the concave recesses generally correspond in three dimension to the creation of a spherical recess which generally seats the annular protuberance 48 of the inserting male fitting 14 and as will be described in further detail. It is also understood that the configuration of the annular protuberance 48 can exhibit any other shape, not limited to that shown, and in order to create a zero free play joint design.

An annular support ledge 54 extends about a circumference of the fluid communicating and male fitting body a linearly spaced distance between the annular protuberance 48 and the nipple end 18. Additional circumferentially offset projecting locations are shown at 56 and 58 a further spaced distance from the support ledge 54 in a direction toward the nipple end 18.

A covering cap 60 exhibits a generally sleeve shaped body and, as shown in cutaway in FIGS. 4A-4B, can further include a first inner circumferential defined surface 62 extending to an open annular end face 63. A circumferential abutment or projection 64 is shown at an intermediate interior location of the cap 60 and which seats against a rear face of the annular support ledge 54 of the male fitting when the cap 60 is supported around the fitting in a forward most displaced position.

A spring 66 seats upon the male fitting 14 so that one end thereof abuts the projecting locations 56/58, an opposite end of the spring 66 engaging a further annular facing circumferential abutment 68 facing opposite the first circumferential surface 62 (these defining opposite faces of an inner projecting circumferential ledge associated with the generally sleeve shaped covering cap 60 and so that a second inner circumferential defined surface 70 is separated from the first surface 62, the second surface extending to a rear edge 72 and seating therein the spring 66.

A second auto shut-off subassembly is provided, generally identical to that depicted at 30-38, and including by an inner linearly displaceable component which is again identified as a button 74, this supported in biased fashion within an entranceway interior defined by the inlet end face 42 of the male fitting by a coil spring 76 and reverse side positioning/supporting press ring 78 (see again FIGS. 4A-4B). As further depicted in the cutaway of FIGS. 4A-4B, the displaceable shut-off button 74 likewise exhibits a generally conical forward face 80 which terminates in a projecting tip exhibiting a similar further projecting nose terminating in a flat end 82 (this as further shown opposing and linearly aligning with the flat end 38 of the first button 30). The button 74 as shown in FIGS. 4A-4B is further seated in a fluid interrupting position (by virtue of the force exerted by spring 76 as further positioned by press ring or stopper 78) against an opposing conical inner face 84 associated with an annular, interior and fluid communicating base surface of the male fitting entranceway aperture 42.

The sleeve shaped covering cap 60 is supported upon the male fitting 14 in linearly displaceable and spring biased fashion towards the convex projecting and circumferentially encompassing portion 48. In a first operative embodiment, the sliding installation of the fingers 20, 22, 24, et seq. of the female fitting 12 over the convex protuberance 48 (with their resultant outer radial expansion as shown in FIG. 4B) results in contact with the open end face 63 of the cap 60 and subsequent rearward and counter biased displacement of the covering cap to a rearward displaced position as referenced by arrow 86 in FIG. 4B in a direction toward the nipple end 18, this providing the necessary clearance for the outward deflecting motion of the female fitting fingers.

Upon seating of the male (convex) outer annular projection 48 into the female (concave) inner annular recessed profile (again referenced by individual pockets 50/52 in FIGS. 4A-4B), concurrent inward and spring loaded contraction of the fingers occurs which results in the exterior linear surfaces of the fingers clearing the inner diameter surface 62 of the open end of the cap 60, thus allowing its spring bias 66 to displace the cap forwardly into the seating position over the projecting ends of the fingers 20, 22, 24, et seq. as best shown in FIG. 1. In this fashion, the open end (again defined by inner surface 62 and annular end face 63) of the cap 60 also partially overlaps the annular and convex protuberant portion 48 of the male fitting 14 in order to securely grip the fingers of the female fitting 12 in their engaged fashion about the male fitting protuberance, thereby preventing inadvertent disengagement of the fitting components under tension, compression or bending leads.

As shown in FIG. 2, which is again a partially exploded view of the assembly in FIG. 1 with male 14 and female 12 fittings separated and better illustrating such features as the female fitting locking fingers 20, 22, 24, et seq., the male fitting cover cap 60 is shown in a forward biased position, with selected auto shut-off component 74 (see again end face 82 in FIG. 2) incorporated into an engaging end of the male fitting 14. As further previously described, FIG. 4A is a linear cutaway view of the quick connect assembly 10 of FIG. 1 in an initially contacting and pre-engagement position established between the male 14 and female 12 fittings, and in which the inwardly spring biased fingers 20, 22, 24, et seq. of the female fitting are in a pre-engaged and free state condition with an initial annular surface location of the male fitting 14 proximate the communicating end face aperture 42. FIG. 4B is a succeeding illustration to FIG. 4A in which the radially outwardly biased fingers, again at 22 and 24, of the female fitting 12 are shown in an intermediate engaging location relative to the annular protuberance 48 associated with the intermediate location of the male fitting 14, and establishing initial contact with the open end face of the retractable covering cap 60.

Figure 5:
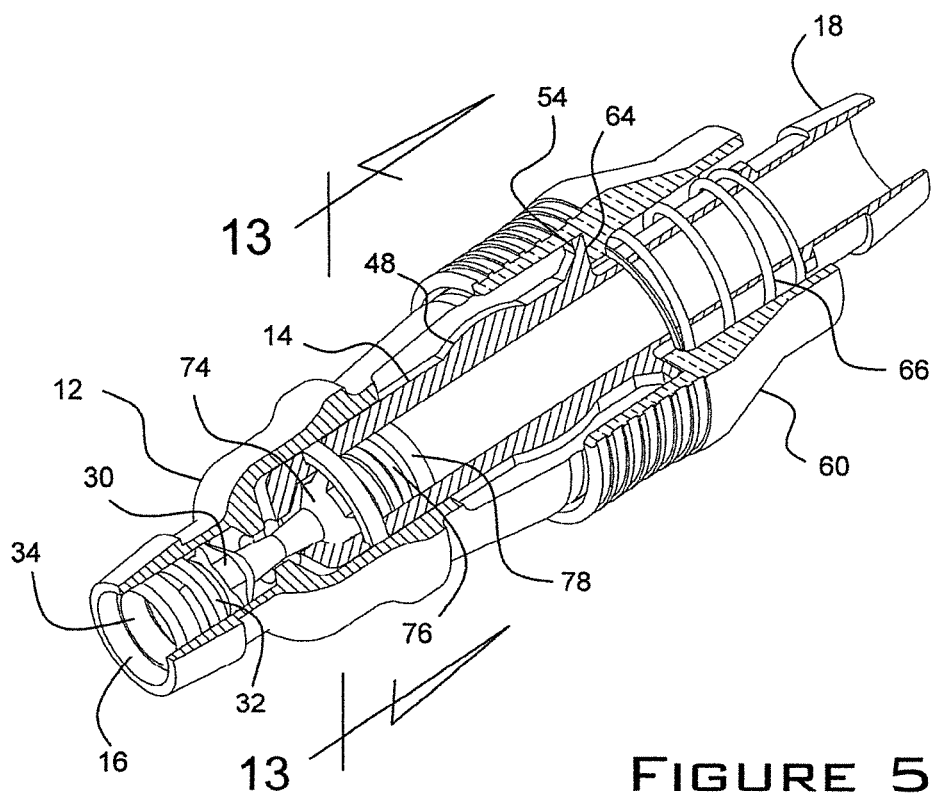
FIG. 5 is a subsequent illustration, in cutaway perspective, of the male and female fittings in locked and engaged position, this including the cover cap slid over the ends of the inner displaced and spring loaded fingers relative to the seating profile established between the underside concave depressions in the circumferentially arrayed fingers and the male fitting annular protuberance, along with a balanced and opposing spring biased contact established between a pair of end surfaces associated with the auto shut-off components, causing the components to unseat from fluid (e.g. liquid, gas, refrigerant, etc.) interrupting inner annular surfaces associated with end locations of each of the fittings, thereby permitting through flow of the fluid across the connecting interface established between the fittings.

FIG. 5 is a subsequent illustration, in cutaway perspective, of the male 14 and female 12 fittings in locked and engaged position, this including the cover cap 60 slid over the ends of the inner displaced and spring loaded fingers 20, 22, 24, et. seq., relative to the seating profile established between the underside concave depressions (see again at 50 and 52) in the circumferentially arrayed fingers 20, 22, 24 et seq., and the male fitting annular protuberance 48. In this engaged position, a balanced and opposing spring biased contact is established between the pair of end surfaces 38 and 82 (see again FIGS. 4A-4B) associated with the auto shut-off components (buttons) 30 and 74, causing the components to unseat from their respective fluid interrupting inner annular surfaces 40 and 84 associated with the opposing end locations defined between each of the fittings.

In this fashion, fluid flow is permitted through the fittings (such as can occur in either direction). The corresponding cutaway of FIG. 13 depicts selected shut-off component 74 in the unseated position (this mirrored by the other counter-balanced shut-off component 30 associated with the female fitting 12) away from the inner seating surface 84 of the male fitting 14.

Figures 13, 13A:
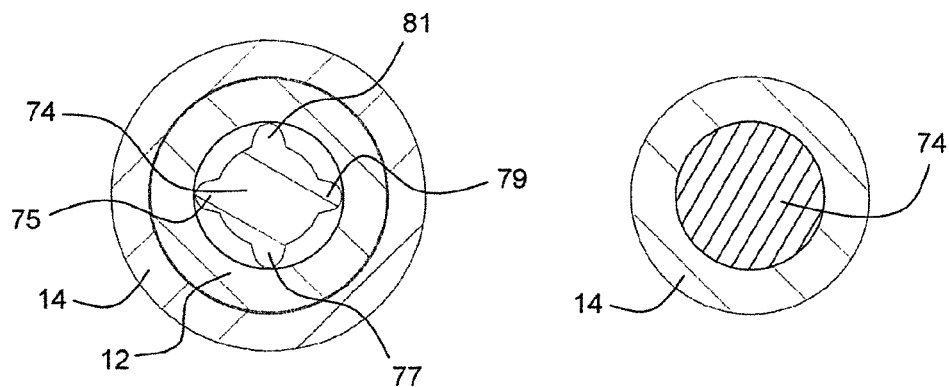
FIG. 13 is a cutaway taken along line 13-13 of FIG. 5 and illustrating the fluid permitting flow profile established between the selected auto shut-off component integrated into the male fitting in relation to the inner fluid interrupting end surface of the male fitting.
FIG. 13A is a further illustration of the auto shut-off component of FIG. 13 in a fluid interrupting position against the inner seating surfaces associated with the forward engaging end of the male fitting.

FIG. 13A is a further illustration of the auto shut-off component 74 of FIG. 13 in a fluid interrupting position against the inner conical seating surfaces 34 associated with the forward engaging end of the male fitting 14. The component 74 as further best shown in FIG. 13 can include circumferentially spaced wings or like projections, see at 75, 77, 79 and 81, extending from radial locations of the button shaped component 74 as depicted in cross section and which, in the unseated position, allowing fluid flow to pass around and in between the projections 75, 77, 79 and 81, across the unseated exterior of the component 74, and through the mating interface between the male fitting end aperture 42 and the female fitting inlet 40 situated within the nipple 16.

Upon separating the fittings 12 and 14, the springs 32 and 76 (each of which are position-ally held in place by the reverse side mounted press rings 34 and 78) exert displacing forces on the buttons 30 and 74 in order to reseat their exterior conical surfaces 36 and 80 against the mating and opposing fluid interrupting profiles 36 and 84, thereby preventing fluid flow through either of the quick connect fittings. This can further include the opposing seating locations integrated into the fluid carrying interiors of the fittings further exhibiting like seating notches or recesses such as for engaging the radial wings or projections 75, 77, 79 and 81 for effectively sealing fluid flow through either fitting.

Figure 6:
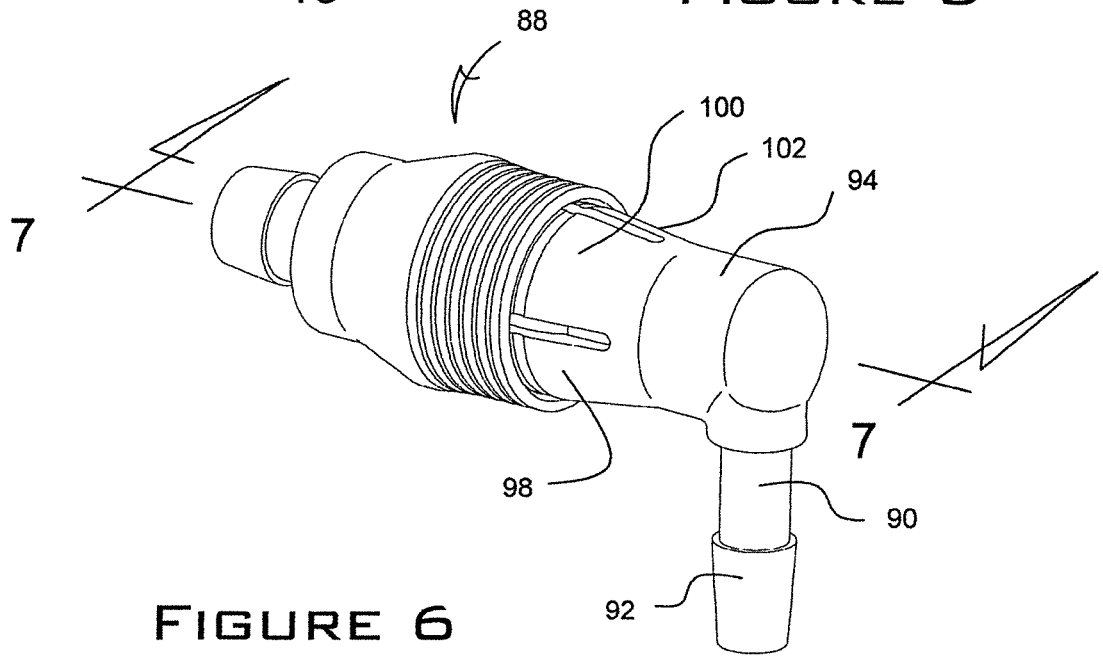
FIG. 6 is a perspective illustration of a quick connect assembly according to a further embodiment and integrating a 90 degree elbow associated with the female fitting.

Proceeding to FIG. 6, a perspective illustration is shown at 88 of a quick connect assembly according to a further embodiment and integrating a ninety degree elbow 90 with end situated nipple 92 (or other suitable connection) associated with a modified female fitting 94. As shown in succeeding linear cutaway of FIG. 7 (as well as the cutaway of sub-variant in FIG. 9), the male fitting 14 is constructed identical to that depicted in FIGS. 1-6.

Figure 7:
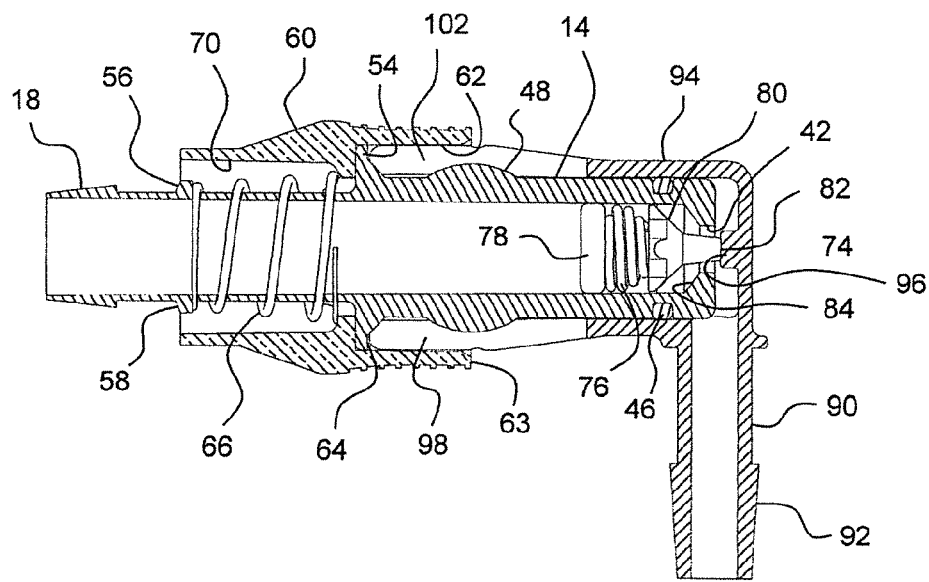
FIG. 7 is a linear cutaway of FIG. 6 and illustrating a single auto shut-off variant incorporated into an end location of the male fitting, with the end face of the spring loaded shut off component counter biasing to an open position in contact with an inner wall location of the bent elbow in the female fitting.

The linear cutaway of FIG. 7 further illustrates a single auto shut-off variant utilizing the subassembly components 74, 76 and 78 incorporated into the forward communicating end 42 end of the male fitting 14, with the other shut-off subassembly 30, 32 & 34 associated with the female fitting of FIG. 1 removed. As further shown in FIG. 7, a protuberant inner wall location 96 is depicted in the cutaway view of bent elbow 90 in the female fitting, this defining the abutment location for the end surface 82 of the shut-off component 80 and further such that, upon the fingers of the female fitting (shown at 98, 100, 102, et seq. and corresponding to as shown at 22, 24, 26, et. seq. in FIG. 1) engaging over the annular protuberance 48 of the male fitting such that the inner concave recesses in the fingers seat thereupon, the end face 82 of shut-off component 74 is forced in a counter biased and unseating direction upon contact, allowing fluid flow between the end unseated component 80 and the (protuberant) inner wall location 96.

Figure 8:
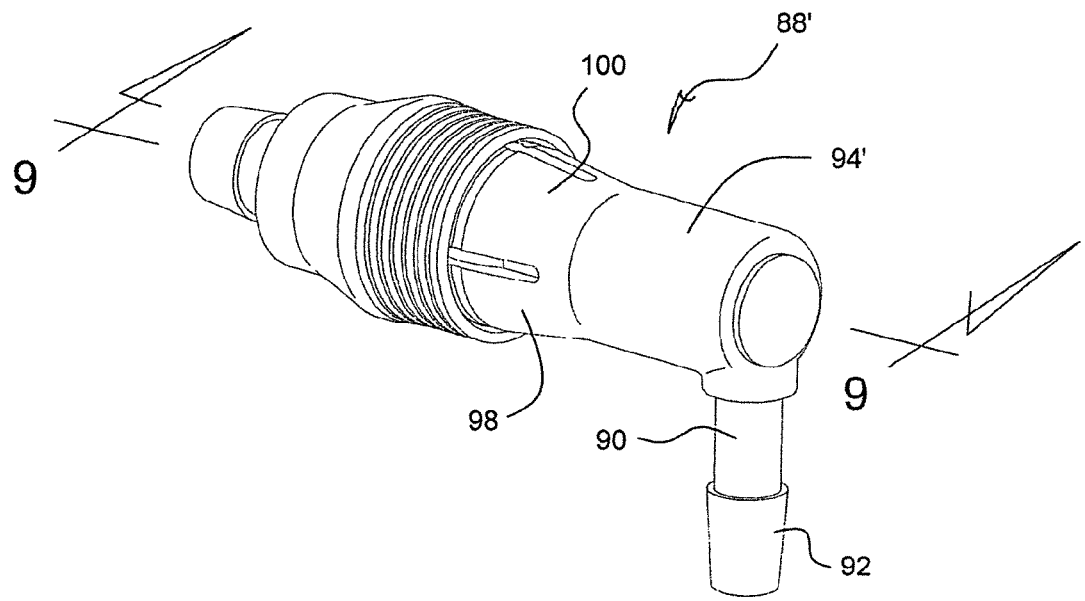
FIG. 8 is a perspective illustration of a sub-variant of the quick connect assembly shown in FIG. 6.

In this fashion, the variant of FIGS. 7-8, operates in auto shut-off fashion with only a single shut-off component 74 and which, upon disconnecting the male and female fittings, causes the spring 76 to slide the component 74 into the flow interrupting position against the inner forward end seating surface 84 of the male fitting 14 (and wherein conical surface 80 of the button component 74 is forced into flow interrupting contact with the opposing surface 84 concurrent with the end face 82 contacting the inner wall location 96.

Figure 9:
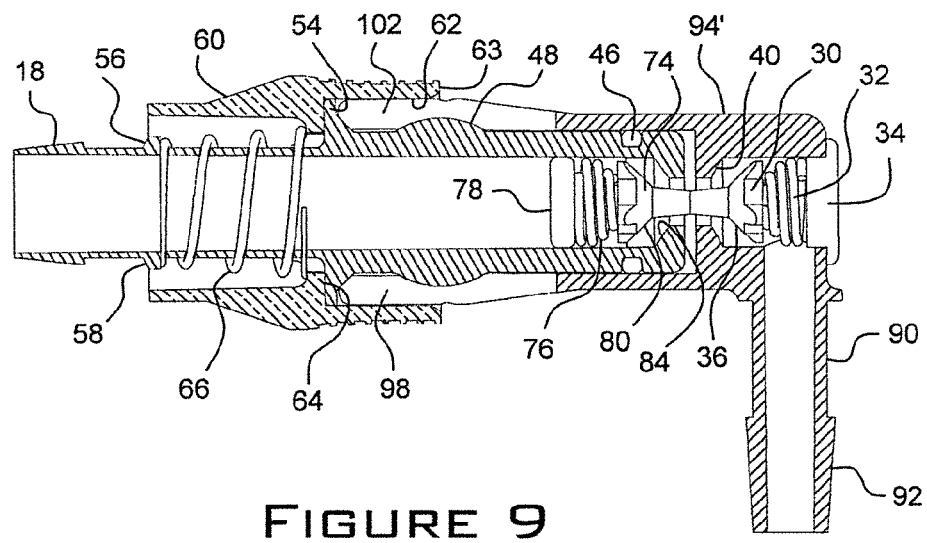
FIG. 9 is a linear cutaway of FIG. 8 and depicting a double auto shut-off variant, similar to the embodiment of FIGS. 1-5 and in which the biasing springs associated with each button shaped shut-off component are balanced to retain both components in open and unseated positions relative to annular fluid (liquid/gas/refrigerant) interrupting/sealing end faces configured within each fitting.

FIG. 8 is a perspective illustration of a sub-variant, at 88', of the quick connect assembly shown in FIG. 6 and which is generally identical to that shown in FIGS. 6-7 except that the main body portion of the female fitting is elongated, at 94', in comparison to that previously depicted at 94. FIG. 9 is a linear cutaway of FIG. 8 and depicting a double auto shut-off variant, similar to the embodiment of FIGS. 1-5 and repetitively numbered and in which the biasing springs 32 and 76 associated with each button shaped shut-off component 30 and 74 are balanced (as in FIGS. 1-6) to retain both components in open and unseated positions relative to the annular fluid interrupting/sealing end faces 40 and 84 configured within each of the female and male terminals. As further shown, press-fit ring for the female shut-off is reconfigured at 34' to bias the spring 32 from a reverse side and in order to maintain the desired counterbalanced arrangement with the male fitting shut-off subassembly 74-78 in the engaged/open position.

Aside from the ninety degree elbow variants 88 and 88' of FIGS. 6-9, additional envisioned variants can include reconfiguring either or both of the female and male fittings in any of a T, cross, or other adaptive fitting shape. Each of the nipple fittings disclosed can also include suitably configured barbs (also interpreted to include inter-engaging threads and other press-fit connections) for facilitating friction engagement of the associated conduits (again depicted at 2 and 4 in FIG. 2).

Figure 10:
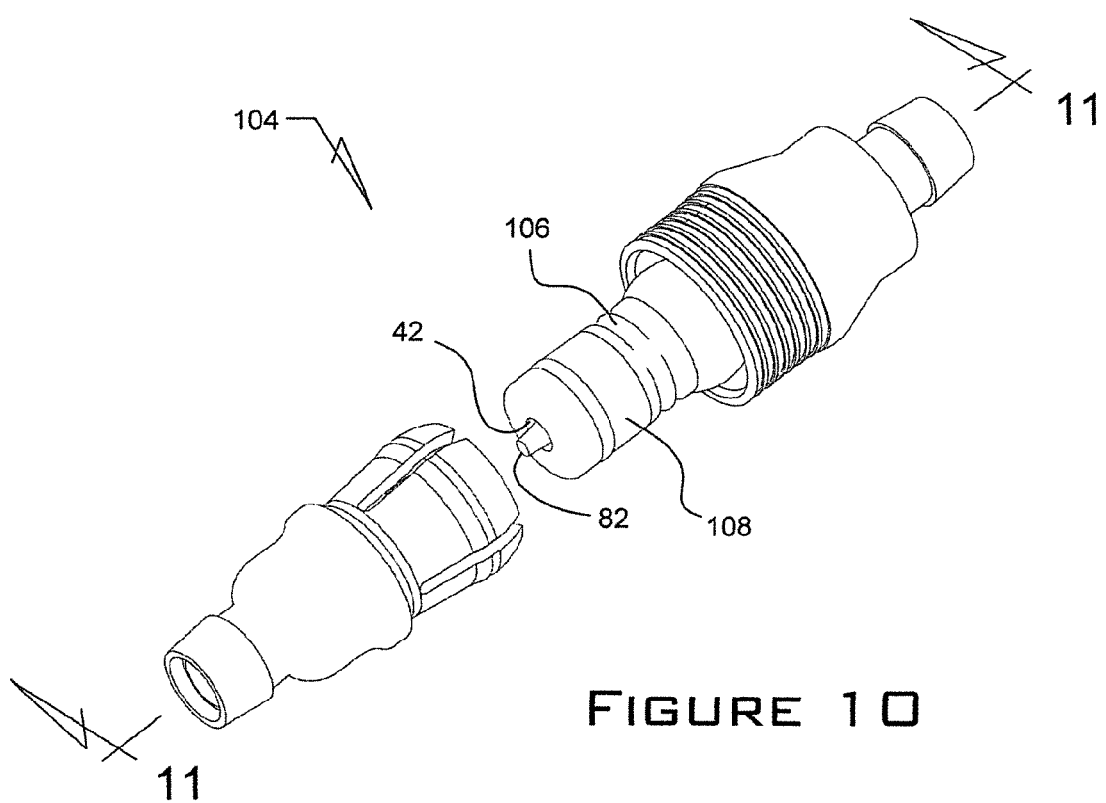
FIG. 10 is a partially exploded view of a quick connect assembly according to a further embodiment and illustrating an engineering thermoplastic vulcanizate material integrated into the male fitting body in order to provide a degree of dynamic flex and resiliency.

FIG. 10 is a partially exploded view, at 104, of a quick connect assembly according to a further embodiment and illustrating an engineering thermoplastic vulcanizate material, further at 106, integrated into a reconfigured male fitting body, further at 108, this in order to provide a degree of dynamic flex and resiliency. As further indicated in the linear cutaway view of FIG. 11, the quick connect assembly is depicted in an engaged and locked position. The female fitting 12 is the same as previously described in the initial variant of FIGS. 1-5.

The male fitting 108 as shown in cutaway is also as previously described at 14 in FIGS. 1-5, with the exception of the vulcanizate material 106, further including such as an EPTV flexible membrane interposed between the annular protuberance 48 associated with the main body portion of the male fitting and a forward most inserting location exhibiting the end aperture 42 and the forward most projecting cone 82 associated with the auto shut-off component 74. Additional features can include incorporating radial fingers, the underside and annular profiles of which are engaged underneath the cap in a fashion which allows the assembly body to both rotate and displace angularly.

Figure 11:
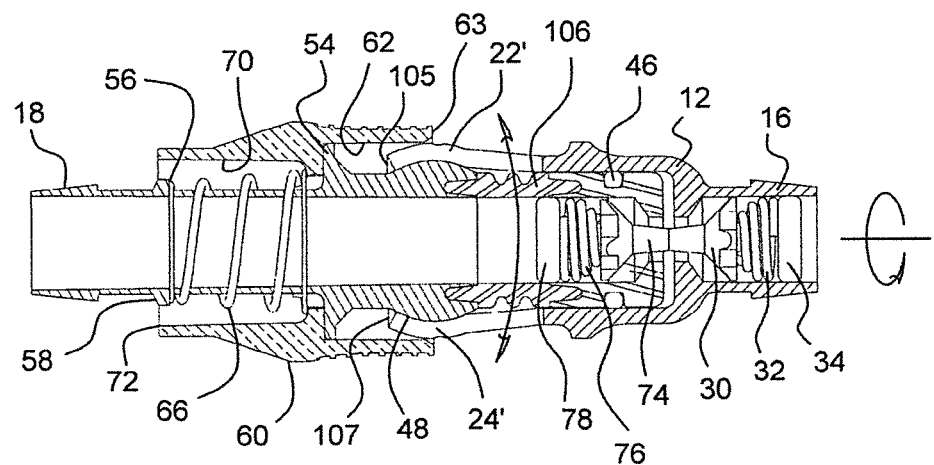
FIG. 11 is a linear cutaway view of the assembly of FIG. 10 in an engaged and locked position and which further illustrates the benefit of establishing a radial profile for the elongated fingers which are engaged underneath the displaceable cap and which allows for establishing a quick connection while also permitting a degree of radial displacement of the assembly.

As best depicted in the cutaway of FIG. 11, the vulcanizate (EPTV) material 106 is exhibited as a generally collar shape, in one instance formed in a "pick and place" and/or a two shot injection molded process associated with the creation of the male fitting, and which provides a dynamic flex joint integrated into the quick connect assembly, such permitting a degree of force absorbing and attenuating pivot/bend and/or rotation (e.g. in one non-limiting example +/−15 degrees). As also shown, the fingers are modified as representatively shown at 22' and 24' and exhibit arcuate end portions, at 105 and 107, these conforming around the annular protuberance 48. The arcuate configuration of the fingers is necessary to allow for a rotational interface to be created with the underside 62 of the cap 60 and which, in combination with the EPTV collar 106, allows for simultaneous rotation and bend/flex between fittings.

Figure 12:
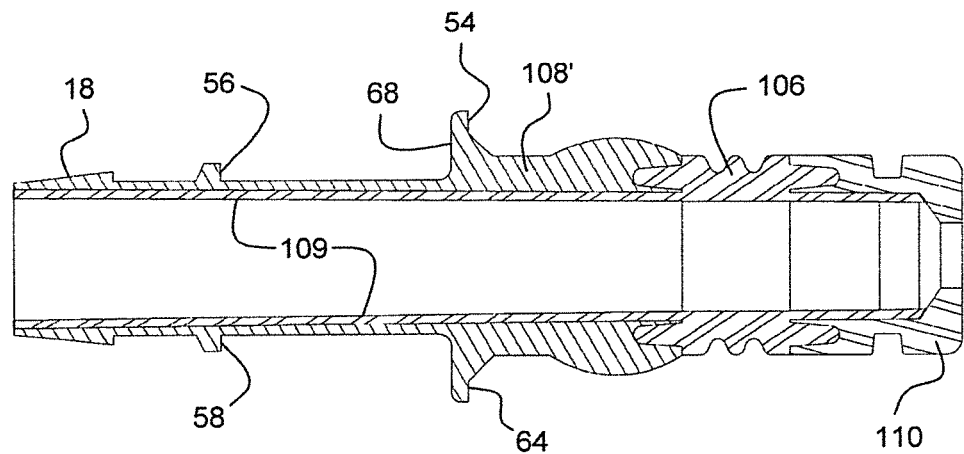
FIG. 12 is a sectional cutaway of a sub-variant of the male fitting depicted in FIG. 11 and including an inner membrane applied to the fluid communicating annular surface of the male fitting, such as through chemical bonding during the molding process, and in order to form a non-leak seal.

As further depicted in the sectional cutaway of FIG. 12, the male fitting can be further modified, as shown at 108', such that the flexible membrane 106 can be combined with an inner membrane, see at 109, which is applied to the fluid communicating surfaces of the male fitting, such as through chemical bonding during the molding process, for forming an additionally dynamically responsive and non-leaking seal to the inside annular fluid passageways associated with either of the male and female fittings.

Additional applications contemplate any configuration of flexible membrane configured in any type of application ranging from a straight in-line quick connect fitting to any other type of stationary fitting (i.e. elbow, T cross, etc.). As further understood, the flexible membrane 106 provides for a degree of dynamic responsive conical rotation of the forward most portion of the male fitting (depicted at 110 in FIG. 12) relative to the main body 108/108' of the related variants in each of FIGS. 11-12. Other envisioned configurations include incorporating rotation permitting bearings and the like at intermediate locations of either or both fittings, alternate or in combination with the use of the flexible membranes 106.

Figure 14:
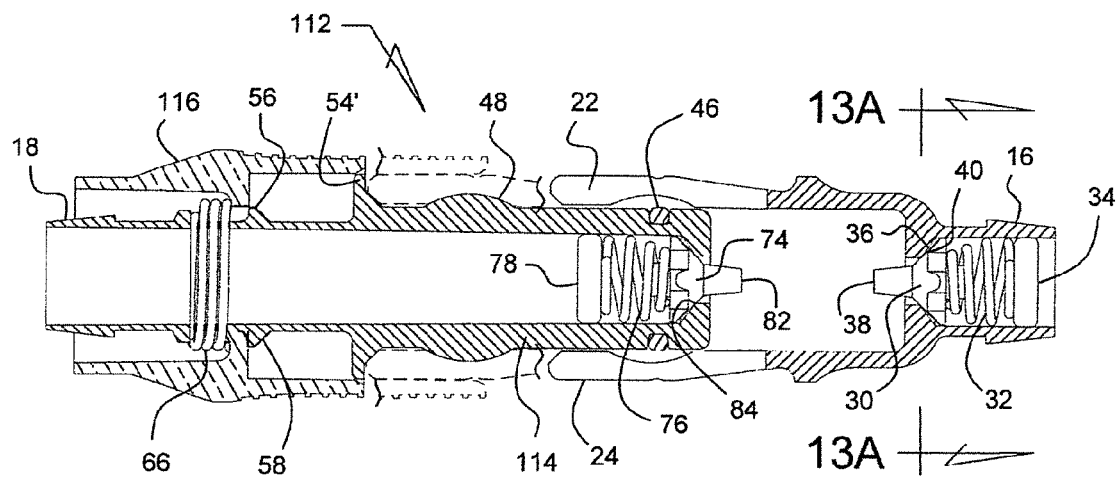
FIG. 14 is a further lengthwise cutaway of a quick connect assembly similar to that previously shown in FIG. 4A and illustrating a manually retractable variant of male fitting with counter bias displaceable covering cap, the assembly being shipped with the cover cap in a counter biased and retracted position and which is twisted to release forwardly displace over the fingers, once separately engaged over the male protuberance.

Proceeding to FIG. 14, a further lengthwise cutaway view is shown at 112 of a quick connect assembly, similar to that previously shown in FIG. 4A, and illustrating a manually retractable variant of male fitting 114, and with a counter bias displaceable covering cap 116, the assembly being shipped with the cover cap in a counter biased and retracted position and which is twisted/rotated to release the cap to forwardly displace over the fingers (again shown at 22 and 24) of the female fitting 12, once separately engaged over the male fitting protuberance 48. The annular flange or ledge, at 54', is modified from that shown in the prior variant of FIG. 4A so that an engagement condition with the forward edge of the covering cap 116 can be optionally established (and prior to rotating disengagement and subsequent forward release of the cap 116 for engaging around the exterior profiles of the fingers 20, 22, 24, et seq.).

As will be described in additional detail with reference to FIGS. 19A-22, further related variants also contemplate the displaceable cap 116 being pre-restrained in a counter biased direction away from the overlapping engagement between the male and female fitting. In a simplest variant, this can further include the user manually holding the cap in the retracted position by the user, until the fingers of the female fitting are installed in the manner previously described and without concurrently displacing the forward edge of the cap rearwardly, the cap subsequent being released upon snap fit engagement of the fingers and allowed to displace by its spring bias over the male protuberance to forward displace around the fingers and to prevent inadvertent disengagement of the fittings.

Figure 15:
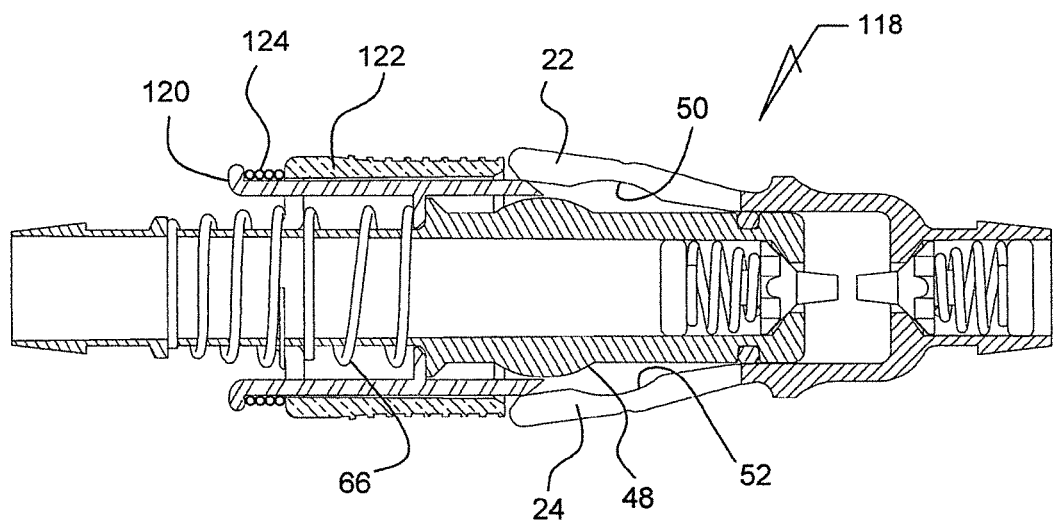
FIGS. 15-16 are a pair of linear cutaway views of a quick connect assembly according to a yet further embodiment and in which a modified spring loaded cap incorporates inner and outer concentrically arranged and inter-displaceable open ended sleeve portions, the inner portion biased forwardly to pre-loading the fingers in the open position relative to the male fitting (FIG. 15), with the outer portions inter-displacing over the engaged fingers and upon prior retraction of the inner open ended sleeve portion (FIG. 16)
Figure 16:
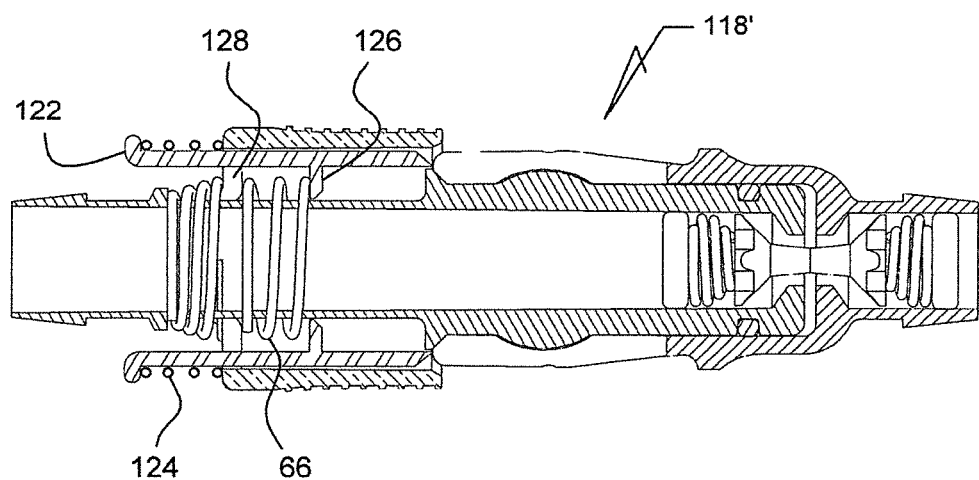

FIG. 15-16 depict a pair of linear cutaway views, respectively at 118 and 118', of a quick connect assembly according to a yet further embodiment and in which a modified spring loaded cap incorporates inner 120 and outer 122 concentrically arranged and inter-displaceable open-ended sleeve portions. The inner portion 120 is biased forwardly to pre-load the fingers in the open position relative to the male fitting (FIG. 15), with the outer portion 122 inter-displacing over the engaged fingers and upon prior retraction of the inner open-ended sleeve portion 122 (FIG. 16).

Additional features include the provision of a secondary spring 124 supported upon a rear annular location of the inner portion 120 and biasing the outer portion 122 in a forward direction toward the fingers 20, 22, 24, et seq. An intermediate inner ledge 126 is associated with the inner portion 122 and is biased by a forward most location of the main spring 66, with a further main rear inner ledge 128 is influenced by an intermediate winding location of the spring 66. In this fashion, a calibrated force profile is established by each of the inner 66 and outer 124 springs in establishing both the finger locking and released positions.

Figure 17:
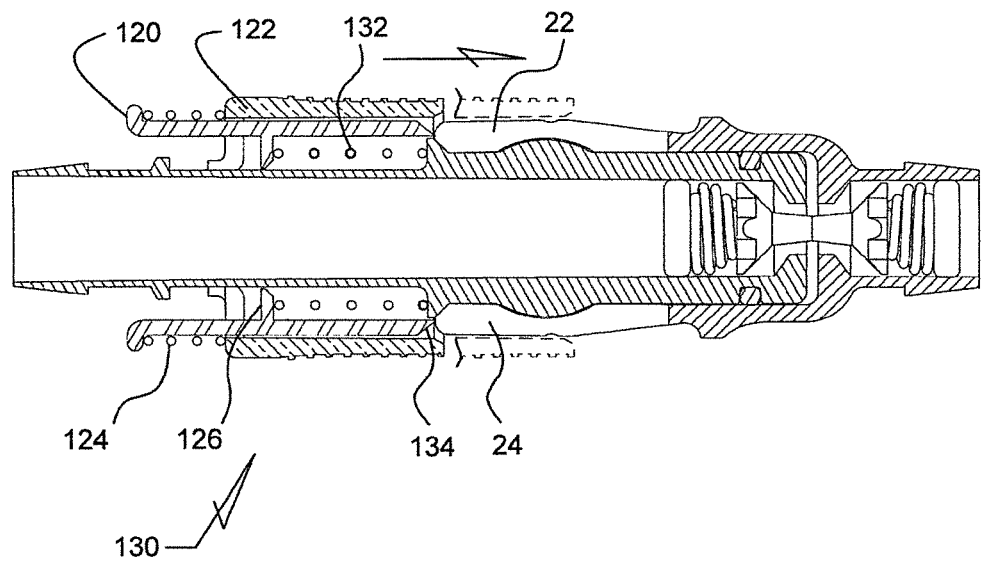
FIGS. 17-18 are a further pair of linear cutaway views of a variant of quick connect assembly in comparison to that shown in FIGS. 15-16, again incorporating a spring loaded cap with dual concentric sleeve portions, the cap can exhibit a pair of redesigned springs to modify the biases established between the inner and outer concentrically arranged and inter-displaceable portions, a first of the spring biases being established between the inner and outer concentric portions and with the outer portion independently sliding into embracing contact around the fingers (FIG. 17) and, upon installation of the female to male fitting interface, can further include the cap being forced rearward in a counter-biased fashion by the fingers during installation such that, in a disengagement protocol (FIG. 18), the outer concentric portion of the cap is retracted away from the fingers, with the inner concentric portion further configured with an inwardly angled and annular leading edge and which, upon displacing forwardly, engaging inside locations of the fingers which are forced radially outwardly to facilitate unseating from the male fitting.
Figure 18:
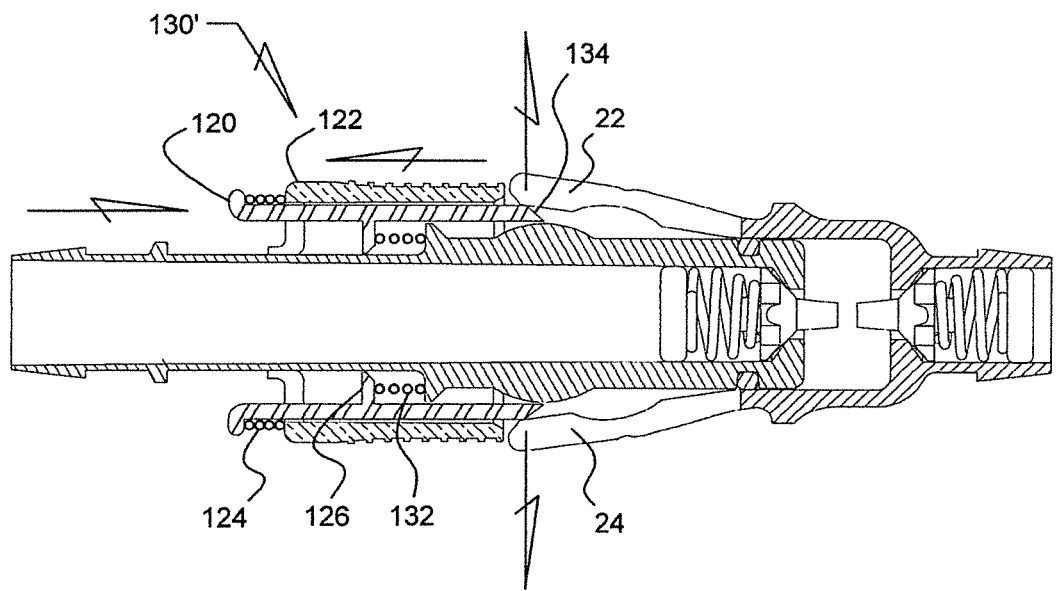

FIGS. 17-18 are a further pair of linear cutaway views, at 130 and 130', of a variant of quick connect assembly in comparison to that shown in FIGS. 15-16, again incorporating a spring loaded cap with dual concentric inner 122 and outer 124 sleeve portions, the cap can exhibit a pair of redesigned springs to modify the biases established between the inner and outer concentrically arranged and inter-displaceable portions. A first of the springs is shown at 132 and is established between the inner and outer concentric portions, forward the intermediate inner extending ledge 126 associated with the inner portion 122, with the second spring as previously described at 124 in FIGS. 15-16.

In operation, and with the outer portion 122 independently sliding into embracing contact around the fingers (FIG. 17) and, upon installation of the female to male fitting interface, the cap (outer layer 122 and inner layer 120) can being forced rearward in a counter-biased fashion by the fingers during installation such that, in a disengagement protocol (FIG. 18), the outer concentric portion 122 of the cap is retracted away from the fingers 20, 22, 24, et seq. The inner concentric portion 120 as shown can be further configured with an inwardly angled and annular leading edge 134 which, upon displacing forwardly, engages inside locations of the fingers which are forced radially outwardly to facilitate unseating from the male fitting.

The illustrations of the alternate variants of FIGS. 15/16 and 17/18 are intended to represent a few of many potential variants of the invention in which the cover cap can be modified to provide varied functionality not limited to the operating variants described of FIGS. 1-6 or the manual pre-retracting variant of the cover cap in the alternate variant of FIG. 14.

Proceeding to FIG. 19A, a partial side cutaway is shown of a male fitting, at 136, according to a further variant and exhibiting a variation of an annular ledge 138 which initially restrains in a pre-retracted position a further variant 140 of a covering cap, similar to as previously depicted in FIG. 14. The cap as shown includes a leading forward edge, at 142, associated with its annular end face and which, in the side cutaway, is biased in the retracted position by an opposing edge profile 144 associated with the ledge 138.

FIG. 19B is a cutaway view taken along line 19B-19B of FIG. 19A and illustrating a variation of a twist and release relationship (such contemplating a tab and slot arrangement established between the annular end face profile 142 of the cap 140 and the opposing outer circumferential edge 144 of the supporting ledge 138). In the position shown, the cap 140 is rotated to an engaged and restrained position in which the open annular end face of the biased and linearly displaceable cap engages the annular support ledge integrally configured with the male fitting.

Also shown in FIG. 19B at 146 is the rotated and gap or slot defining location 146 in the outer cap 140 and which, upon being rotated, allows the covering cap (FIG. 20B) to be released in the illustration of FIG. 20A to displace linearly over the annular support ledge 138 and across the male to female fitting interface to overlay the female fingers 22 and 24. At that point, the cap 140 is rotated in the direction of arrow 148 so that a further interior location 150 (FIG. 20A) associated with a recessed interior of the cap 140, this at a location proximate with an abutment 152 defining an end stop of the inner sleeve, is cased to re-engage the cap 140 with the male fitting annular ledge 138 while in overlaying and anti-radially expanding and restraining engagement with the female fingers.

Figure 21:
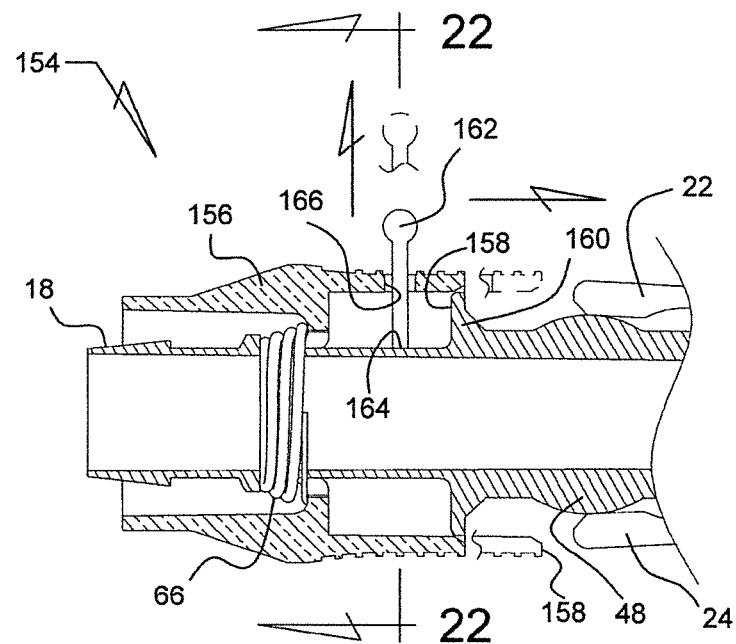
FIG. 21 is a partial sided cutaway of a male fitting with a pre-retracted covering cap according to a further related variant and illustrating a restraining pin releasably mounted to the male fitting and extending through an intermediate location of the cap arranged in a first engaged and restrained position.

Proceeding to FIG. 21, a partial sided cutaway is depicted at 154 of a further variation of a male fitting with a pre-retracted covering cap 156 with configured open annular end face 158 and which overlays a reconfigured annular ledge 160 of the male fitting in a counter spring 66 biased and restrained fashion away from the male fitting protuberance 48. A restraining pin 162 is configured to engage a surface 164 of the male fitting so that the pin 162 extends through a closed perimeter window 166 defined at an intermediate location of the cap 156 arranged in a first engaged and restrained position.

Figure 22:
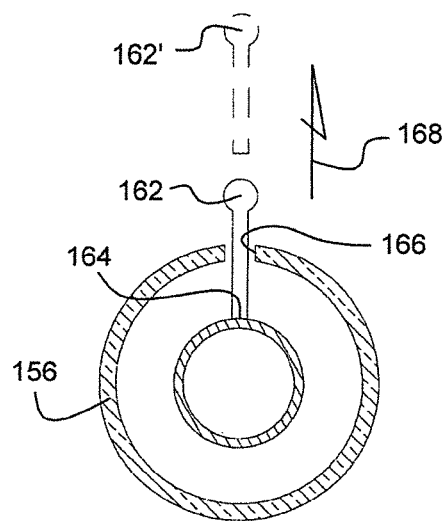
FIG. 22 is a cutaway view taken along line 22-22 of FIG. 21 and illustrating the configuration of the covering cap which permits it to displace upon removal of the pin in a released and forwardly extending fashion over the female fingers.

FIG. 22 is a cutaway view taken along line 22-22 of FIG. 21 and illustrating the configuration of the covering cap 156 which is permitted to displace in response to its spring 66 bias upon removal of the pin 162 according to directional arrow 168 (further in the fashion shown in phantom at 162'). In this manner, the cap 156 is released in forwardly extending fashion over the female fingers (see again at 22 and 24 in FIG. 21) to again prevent outer radial expansion and linear retraction of the same from the male fitting protuberance 48.

Having described my invention, other and additional preferred embodiments would be obvious to one of ordinary skill in the art to which the invention pertains, and without deviating from the scope of the appended claims:

I claim:

1. A quick connect assembly, comprising:
    a female fitting having a fitting inter-engaging end adapted to engage another fitting and a nipple defining end adapted to engage a first fluid carrying conduit, said fitting exhibiting a generally elongated and three dimensional configuration established by a plurality of linearly extending and circumferentially arrayed fingers separated by a plurality of linear extending slots along said fitting, said fingers each including an inwardly spring loaded construction and each further exhibiting undersides which collectively define a recessed circumferential profile;
    a male fitting having a fitting inter-engaging end adapted to engage another fitting and a nipple defining end adapted to engage a second fluid carrying conduit, said male fitting including an annular projecting portion at an intermediate location which generally matches in shape said recessed circumferential profile of said inwardly facing surfaces of said fingers, said male fitting terminating in a fluid receiving aperture location and inserting through an open end of said female fitting defined between said extending fingers, said annular projecting portion contacting edge locations associated with said fingers, causing said fingers to outwardly deflect, following which said fingers inwardly retract concurrent with said projecting portion seating within said underside circumferential profile;
    a first shutoff assembly incorporated into an interior of said female fitting, a second shutoff assembly incorporated into a forward most fluid receiving location of said male fitting, each of said female and male fittings further including a three dimensional and tapered shut-off body terminating in a forward most flattened end, a spring integrated into each fitting and biasing a rear of each shutoff body into a sealing engagement with a mating tapered perimeter defined in each of said fittings; and
    a linearly displaceable and sleeve shaped cap supported upon an intermediate location of said male fitting, said cap being biased in a direction towards said projecting portion, said cap being displaced in a counter-biasing direction away from said projecting portion and, upon said fingers engaging over said projecting portion and subsequently inwardly retracting upon said underside recessed profiles seating against said projecting portion, said flattened ends of said shut-off bodies coming into opposing contact with each other and counter-biasing contact against said springs, said bodies each unseating rearwardly from said mating tapered perimeters to allow fluid flow across said fittings, said cap displacing in seating position over said fingers to prevent inadvertent disengagement of said male and female fittings; and
    said projecting portion further comprising a convex profile, said underside recesses of said fingers each further having a mating concave profile.

2. The assembly as described in claim 1, further comprising a coil spring seated about a stem portion associated with said male fitting and biasing said displaceable cap in a direction toward said projecting portion.

3. The assembly as described in claim 1, further comprising at least one of said fittings further comprising an elbow or bend established between said nipple defining end and fitting inter-engaging end.

4. The assembly as described in claim 1, further comprising a dynamic flex joint incorporated into a main body of at least one of said fittings.

5. The assembly as described in claim 4, said flex joint further comprising an engineered thermoplastic vulcanizate (ETPV) for permitting a degree of force absorbing and attenuating pivot/bend and/or rotation.

6. The assembly as described in claim 4, said fingers further comprising arcuate projecting ends which conform around the annular projecting portion and which, in combination with said flex joint, permits both rotation and bend to occur between said fittings.

7. The assembly as described in claim 4, further comprising an inner membrane applied to a fluid communicating interior of said fitting for forming a non-leaking seal.

8. The assembly as described in claim 1, said male fitting further comprising an annular projecting ledge at an intermediate location which establishes a catch location with a forward end face of said displaceable cap in a pre-retracted position, a tab and slot arrangement established between an annular end face of said cap and an opposing outer circumferential edge of said annular supporting ledge, said cap being rotated to disengage said tab from said slot and then allowed to displace by its spring bias over said projecting portion and around said fingers.

9. The assembly as described in claim 1, further comprising a pin seating through a window aperture in said cap and engaging a location of said male fitting in said counter-biasing direction away from said projecting portion, upon removal of said pin, said cap then being allowed to displace by its spring bias over said projecting portion and around said fingers.

10. The assembly as described in claim 4, said flex joint further comprising a two shot injection molded process which joins first and second body portions associated with said fitting.

11. The assembly as described in claim 7, further comprising a chemical bonding process for applying said inner membrane to said fluid communicating interior associated with said fitting.

12. The assembly as described in claim 1, said cap further comprising inner and outer concentrically arranged and inter-displaceable open-ended sleeve portions.

13. The assembly as described in claim 12, further comprising said inner portion being biased forwardly to pre-load said fingers in an open position relative to said male fitting, said outer portion subsequently inter-displacing over said engaged fingers and upon retraction of said inner portion.

14. The assembly as described in claim 12, further comprising a secondary spring supported upon a rear annular location of said inner portion and biasing said outer portion in a forward direction toward said fingers.

15. The assembly as described in claim 14, further comprising an intermediate inner ledge associated with said inner portion and being biased by a forward most location of a main spring supported about a stem of said male fitting and biasing said inner portion toward said projecting portion, said inner portion further having a second inner ledge spaced rearwardly from said intermediate ledge and which is influenced by an intermediate winding location of said main spring to establish a calibrated force profile in both finger locking and released positions.

16. The assembly as described in claim 12, further comprising a pair of springs for biasing said inner and outer concentrically arranged and inter-displaceable portions, a first of said springs being established between said inner and outer portions, forward an intermediate inner extending ledge associated with said inner portion, said second spring supported upon a rear annular location of said inner portion and biasing said outer portion in a forward direction toward said fingers.

\* \* \* \* \*